US011625492B2

(12) United States Patent
Link, II

(10) Patent No.: US 11,625,492 B2
(45) Date of Patent: *Apr. 11, 2023

(54) METHOD AND SYSTEM FOR SECURELY PROVIDING VEHICLE SERVICES DATA TO A VEHICLE

(71) Applicant: M2MD Technologies, Inc., Atlanta, GA (US)

(72) Inventor: Charles M. Link, II, Atlanta, GA (US)

(73) Assignee: M2MD TECHNOLOGIES INC., Atlanta, GA (US)

( * ) Notice: Subject to any disclaimer, the term of this patent is extended or adjusted under 35 U.S.C. 154(b) by 179 days.

This patent is subject to a terminal disclaimer.

(21) Appl. No.: 17/171,952

(22) Filed: Feb. 9, 2021

(65) Prior Publication Data

US 2021/0165895 A1 Jun. 3, 2021

Related U.S. Application Data

(63) Continuation of application No. 15/679,646, filed on Aug. 17, 2017, now Pat. No. 10,922,424.

(51) Int. Cl.
*G06F 21/60* (2013.01)
*H04L 9/40* (2022.01)
(Continued)

(52) U.S. Cl.
CPC ......... *G06F 21/606* (2013.01); *H04B 5/0031* (2013.01); *H04L 63/0823* (2013.01);
(Continued)

(58) Field of Classification Search
CPC . G06F 21/606; H04B 5/0031; H04L 63/0823; H04L 67/06; H04L 67/12; H04L 69/14; H04W 12/06
See application file for complete search history.

(56) References Cited

U.S. PATENT DOCUMENTS 6,209,026 B1 * 3/2001 Ran ..................... G06Q 10/047
702/3
8,930,067 B1 * 1/2015 Green ................. H04W 12/084
705/7.41

(Continued)

OTHER PUBLICATIONS

Tsai, Y. R., & Chang, C. J. (2006). SIM-based subscriber authentication mechanism for wireless local area networks. Computer Communications, 29(10), 1744-1753. (Year: 2006).*

*Primary Examiner* — Catherine Thiaw
(74) *Attorney, Agent, or Firm* — John L. Doughty; Doughty Law, L.L.C.

(57) ABSTRACT

A computer device, having at least two long-range wireless profiles and coupled with a communication bus of a vehicle, receives a notice that a vehicle-centric download for the computer device, or for a vehicle device coupled to the communication bus, is pending from a remote server. The vehicle computer device determines the size and security requirement associated with the pending download, and a current operational state of the vehicle. If the size or security requirement is low, a consumer-centric profile may be used for the download even if the vehicle is currently being used. If the download file size is large or requires very high security, or if a user is currently using the computer device according to the consumer-centric profile, the computer device may schedule the download to occur after receiving a trigger event occurrence message.

6 Claims, 3 Drawing Sheets

(51) Int. Cl.
    *H04B 5/00*     (2006.01)
    *H04L 67/12*     (2022.01)
    *H04W 12/06*     (2021.01)
    *H04L 69/14*     (2022.01)
    *H04L 67/06*     (2022.01)

(52) U.S. Cl.
    CPC .............. *H04L 67/06* (2013.01); *H04L 67/12* (2013.01); *H04L 69/14* (2013.01); *H04W 12/06* (2013.01)

(56) References Cited

U.S. PATENT DOCUMENTS

| | | | |
|---|---|---|---|
| 2010/0228404 A1* | 9/2010 | Link, II | G06F 9/44542 701/1 |
| 2011/0215758 A1* | 9/2011 | Stahlin | H04B 3/542 320/109 |
| 2017/0024201 A1* | 1/2017 | Diedrich | G06F 8/65 |
| 2017/0207956 A1* | 7/2017 | Cabral | H04W 4/50 |
| 2017/0322791 A1* | 11/2017 | Tiles | G06F 8/65 |
| 2018/0196656 A1* | 7/2018 | Miller | G06F 8/71 |
| 2018/0272964 A1* | 9/2018 | Netter | G06F 8/65 |

* cited by examiner

METHOD AND SYSTEM FOR SECURELY PROVIDING VEHICLE SERVICES DATA TO A VEHICLE

CROSS REFERENCE TO RELATED APPLICATION

This application is a continuation of, and claims priority under 35 U.S.C. § 120 to, U.S. patent application Ser. No. 16/679,646 filed on Aug. 17, 2017, and entitled "Method and system for securely providing vehicle services data to a vehicle," the entirety of the contents of which is incorporated herein.

FIELD

The field relates, generally, to managing wireless communication with a mobile machine.

SUMMARY

Smart phones, tablets, laptops, and other similar mobile computers have come into almost ubiquitous use with consumers, as well as with professional vehicle operators and equipment service personnel, and more and more equipment, such as, vehicles, vending machines, coin-operated machines, currency-operated machines, credit/debit-card-operated machines, and smart-phone-operated machines can be wirelessly controlled, wirelessly operated, and wirelessly receive payment for products associated therewith from the mobile computer devices. Typically, vehicles, and other machines that may be operated wirelessly from a user device ("UE") (typically a smart phone, but may also be a tablet, lap top computer, smart-watch, wearable device, or other similar wireless mobile device that can communicate with a wireless network, such as a cellular telephony/mobile data network, a Wi-Fi network, or via a short range wireless link, such as Bluetooth or near field communication ("NFC")) through interaction between the UE and a wireless mobile device connected with the vehicle, or other machine. For purposes of simplicity and clarity, description herein will primarily be in reference to a vehicle as the wirelessly controllable device that may be controlled by a UE, but concepts disclosed herein may also apply to wirelessly controllable/interactive machines such as vending machines, sales kiosks (such as may be operated by business operators such as restaurants and airlines for taking orders and ticketing, respectively), drones, audio/video entertainment device, gaming device, or the like.

In the vehicle context, a vehicle typically includes a communication bus, which may be a controller area network ("CAN") bus, or similar, that connects various sensors (e.g., engine-related, transmission-related, steering, braking, acceleration, and other sensors that detect vehicle operational information), and provides the operational information from there to a central vehicle computer, such as an engine control module ("ECM"). The vehicle may also include a plurality of operational modules that connect to the communication bus, which modules may include a starting system module, door lock/unlock actuators and related circuitry, window motors and associated circuitry, heating/ventilating, and air conditioning ("HVAC") equipment and associated circuitry, navigation system, infotainment system, and the like. The modules may receive instructions from the ECM to perform such actions as unlocking the vehicle's doors, operating one or more windows, starting the vehicle (i.e., cranking the engine or enabling operation of an electric vehicle's propulsion system), operating the HVAC system, and the like. The ECM may generate messages that cause operation of various modules and provide the operational message to the vehicle's CAN bus, or similar. The operational messages may be generated in response to a user's interaction with the vehicle (i.e. operating a key in a lock of the vehicle, entering a code with a push button pad or touchscreen, providing a voice command, or the like).

Or, the ECM may receive messages from an external source, such as a vehicle telematics module, which may be referred to as a telematics control unit ("TCU"). A TCU may be a computer device that has a computer processor and memory as well as circuitry for transmitting and receiving data via long range and short range wireless links. Examples of long range wireless link protocols include GSM, CDMA, LTE, and the like. A TCU may be a device that is fixed/installed into a vehicle when the vehicle is manufactured and that communicates with a vehicle communication bus such as a CAN. Alternatively, instead of being installed when a vehicle is manufactured, a TCU may be a removable device that plugs into a diagnostic port of a vehicle, such as a vehicle's OBD-II port, and communicates with a vehicle's CAN via the diagnostic port. In an aspect, some functionality of a TCU may be performed by a user's user equipment device ("UE") such as a smart phone, tablet, laptop, or the like, in communication with a removable or permanently-installed computer device via short range wireless link./protocol, such as Bluetooth or Wi-Fi.

The TCU may receive operational/control information messages wirelessly via a long-range wireless communication network, such as a wireless mobile network (i.e., a wireless cellular/data network that may support LTE, CDMA, GSM technologies, or the like). The TCU may receive operational/control information messages that a telematics services provider generates at an internet-connected telematics services provider's network server, which may be referred to as a telematics operations server ("TOS"). (A TOS may be operated in connection with a telematics operation center ("TOC"), such as a call center, either staffed with personnel, or an unstaffed computer system that operates automatically.) The TCU may receive operation/control messages that a user may generate with his, or her, smart phone, or other mobile computing device. A TCU may also report vehicle condition information to a UE or to a TOS/TOC. A vehicle manufacturer may, from time to time, provide updates to a TCU, or to a vehicle module using a long-range wireless link, such as may be associated with an LTE data plan that is provided for exclusive use of the manufacturer for communicating with the TCU/vehicle. Alternatively, a TOS/TOC may, in the stead of a vehicle's manufacturer, wirelessly provide updates to the vehicle or TCU. Examples of updates that a TOS/TOC may provide may include TCU software reflashing/updating, ECU reflashing/updating, other vehicle module reflashing/updating, and the like. For purposes of discussion, communication with a TCU by a TOS/TOC or vehicle manufacturer may be referred to as vehicle-oriented services, or vehicle service. Vehicle services may be delivered via a TCU using a vehicle subscriber identity module ("SIM") that has been installed into the TCU, or a vehicle SIM profile, which may not require the presence of a physical SIM in the TCU. Charges for providing vehicle services through a vehicle SIM as part of a telematics services subscription are typically included in a subscription amount.

In addition to receiving operational commands to operate a vehicle, or reflashing/updating from a vehicle manufacturer/TOC system, the long-range wireless circuitry of the TCU may be used by a consumer to wirelessly obtain personal consumer services that may not be related to operation of the vehicle. Such consumer-oriented services may include internet browsing, audio or video streaming, voice call services, video conferencing services, file downloading, and the like, and may be referred to as consumer services. Consumer services may be delivered via a TCU using a consumer subscriber identity module that has been installed into the TCU, or a consumer SIM profile, which may not require the presence of a physical SIM in the TCU.

Occasionally, while a user is obtaining consumer services using a consumer SIM, or consumer SIM profile in the TCU, a vehicle manufacturer or a telematics services provider determines the need to schedule an update to the TCU or other vehicle modules, such as an update to a map of a navigation system. To avoid using a currently-in-use connection to the vehicle that was established according to a consumer SIM, the TCU may, upon receiving a notification via connection over a secure tunnel established with the consumer SIM and the data purchased by the consumer, determine whether to receive the vehicle services or whether to postpone receiving of the vehicle services until predetermined condition is met, such as for example, the vehicle enters a key-off condition.

DETAILED DESCRIPTION

As a preliminary matter, it will be readily understood by those persons skilled in the art that aspects described herein are susceptible of broad utility and application. Many methods, embodiments, and adaptations other than those herein described as well as many variations, modifications and equivalent arrangements, will be apparent from or reasonably suggested by the substance or scope of the aspects described herein.

Accordingly, while the present invention has been described herein in detail in relation to preferred embodiments, it is to be understood that this disclosure is only illustrative and exemplary of the present invention and is made merely for the purposes of providing a full and enabling disclosure of the invention. The following disclosure is not intended nor is to be construed to limit the present invention or otherwise exclude any such other embodiments, adaptations, variations, modifications and equivalent arrangements, the present invention being limited only by the claims appended hereto and the equivalents thereof.

Figure 1:
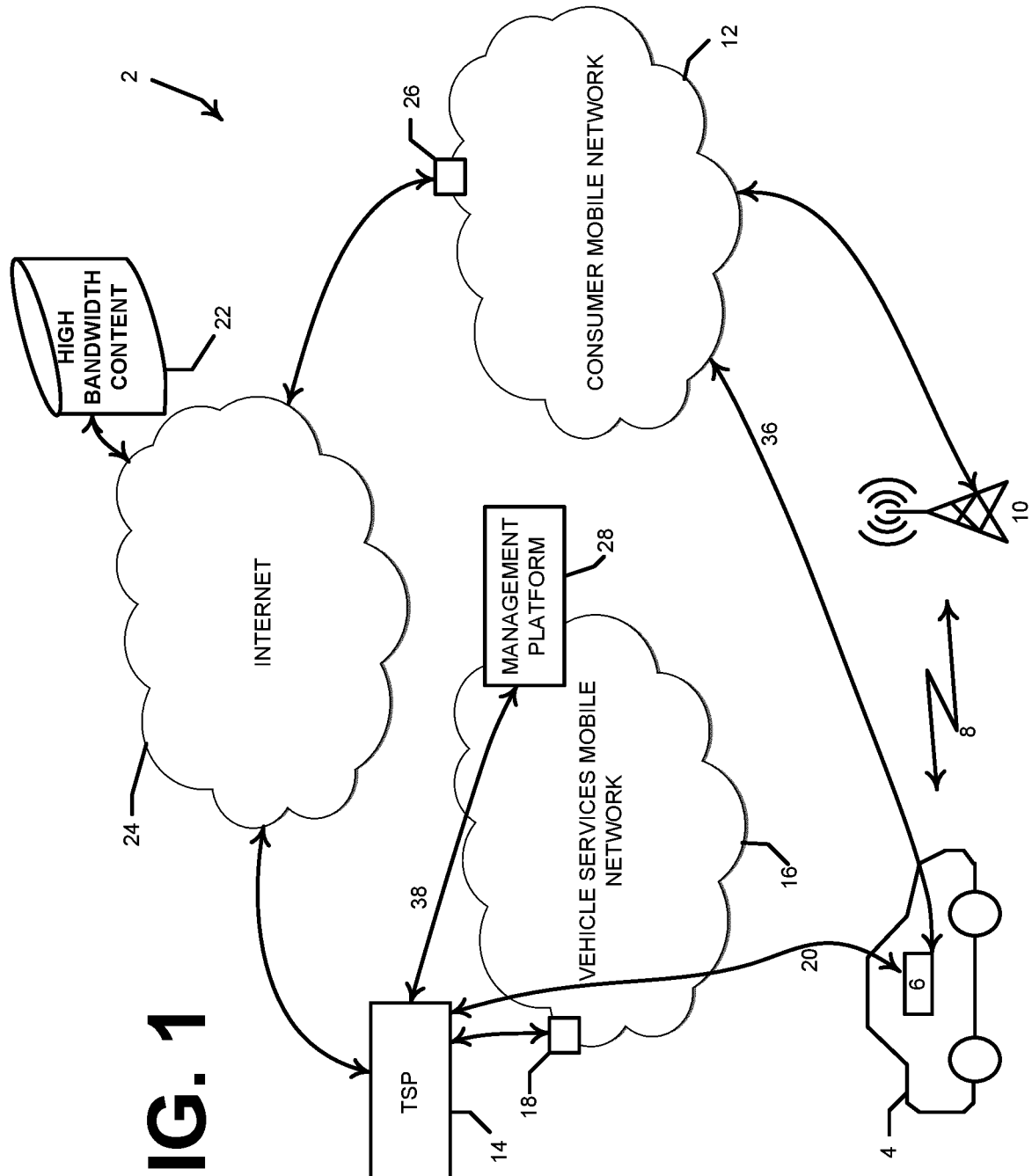
FIG. 1 illustrates a wireless network environment with a vehicle.

Turning now to the figures. FIG. 1 illustrates a network environment 2 that includes a vehicle 4. Vehicle 4 includes a control unit 6, for example a telematics control unit ("TCU"). Control unit 6 may communicate wirelessly via a wireless link 8 with a radio access network ("RAN") 10, which may be associated with a mobile network 12 that provides services to a user of vehicle 4. For example, a user of vehicle 4 may have selected mobile network 12 (e.g., one of Verizon, AT&T, T-Mobile, Sprint, etc.) to provide wireless service to a personal user equipment ("UE") device, such as a smart phone or a tablet of the user. Network 12 may be referred to herein as consumer services network, as a consumer mobile network, or simply as a consumer network.

Typically, a user's personal device includes a subscriber identity module ("SIM") that facilitates wireless electronic communication between the personal device and network 12. A SIM may contain information and circuitry on a physical SIM that may be removably installed in a user device, wherein the information and circuitry may be used for authenticating a user device with a wireless mobile network. Instead of a physical SIM card installed in a user device, a user device may include SIM profile information that facilitates a processor of the user device performing authentication procedures for authenticating the user device with a wireless mobile network. Accordingly, control unit 6 may include a physical SIM, or merely SIM profile information, for use in authenticating the control unit to a wireless mobile network.

Control unit 6 typically is configured for transmitting and receiving vehicle-centric data (which may be referred to herein as vehicle data or vehicle services) with a telematics back end central computer system 14 of a telematics services provider ("TSP"). Typically, a TSP arranges with a particular wireless mobile network 16 (e.g., one of Verizon, AT&T, T-Mobile, Sprint, etc.) to securely transmit and receive vehicle data via a secure APN 18 of network 16. Secure tunnel 20 is shown as a logical data flow path between TSP back end 14 and control unit 6—it will be appreciated that data of flow 20 typically flows through APN 18 of network 16. For purposes of discussion, network 16 may be referred to herein as a vehicle services network, as a vehicle mobile network, or simply as a vehicle network. Although typically considered as part of vehicle 4, control unit 6 may be referred to herein as a UE because it includes similar circuitry that performs many of the same functions as a user's personal smart phone or tablet UE.

Typically, a user of vehicle 4 receives consumer services with his, or her, UE from a content provider's central computer server 22 via Internet 24. When a user's UE receives services during such activities as Internet browsing, file download, music or video streaming, etc., such services typically flow through an APN 26 of consumer network 12. Typically, consumer services, which may be referred to herein as "consumer-oriented" services or "consumer-centric" services, include content of high volume (i.e., downloading a large file such as a high resolution image, audio file, or video file), and high bandwidth data paths via a high bandwidth APN of the consumer network 12 are used to ensure fast web browsing and low latency of content streaming. On the other hand, vehicle services, which may be referred to herein as "vehicle-oriented" services or "vehicle-centric" services, typically include updates to control unit 6, or other modules of vehicle 4. Updates to other modules may include downloading of map files for a navigation system or downloading of software files for the reprogramming (which may be referred to as reflashing) of various control modules in vehicle 4, such as air bag modules, HVAC control modules, electric motor power management and control, engine management, etc. Vehicle data may be large, or high-volume, files, such as a navigation map update, or vehicle data/services may be relatively small data files such as a revision to an engine management program.

FIG. 1 also shows a management platform 28, which may be coupled to Internet 24 via APIs with a network component, such as an HSS, of vehicle services mobile network 16. Typically, management platform 28 is operated by an entity that has a relationship with the services provider that operates backend 14; in some cases, management platform may in fact perform the functionality of the services provider back end system 14. Accordingly, flow path 38 is shown between telematics services provider backend central computer system 14 and management platform 28 to indicate cooperation between management platform 28 and TSP 14. Management platform 28 typically performs, or manages, initial setup of one or more subscriptions of control unit 6 to network 16. During setup/management of subscription profiles (i.e., associating SIMs, or SIM profiles, of device 6 with services subscriptions on network 16) management platform 28 may set up a secondary SIM profile (corresponding to a subscriber/user profile with services subscription on network 12, rather than a vehicle services profile) within a SIM of control unit 6.

It will be appreciated that flow paths 20 and 36, and 38 are shown for purposes of discussion, and that wireless communication between control unit 6 and internet 24, consumer network 12, or vehicle network 16 physically occurs via wireless link 8. Furthermore, although wireless link 8 is shown between control unit 6 and consumer network 12, it will be appreciated that the vehicle control unit may establish a wireless link with a network other than the vehicle network 16 or the consumer network 12 when vehicle 4, and thus control unit 6, is outside of a coverage area of a RAN that corresponds to the consumer network or the vehicle network. In addition, it will be appreciated that when operating vehicle 4, a user may receive consumer services from provider 22 via his, or her UE over consumer network 12, but a consumer SIM, or SIM profile in control unit 6 may actually facilitate the providing of the consumer services via wireless link 8 with the user's UE, which may be in wireless communication with the control unit via a short range wireless link, such as for example, via a Wi-Fi hotspot signal, or via a Bluetooth signal. In such a scenario, a consumer SIM, or SIM profile, of control unit 6 would have authenticated with consumer network 12 and the user's UE would operate essentially as a wirelessly-connected peripheral to the control unit. (Such as via remote SIM Access Protocol.)

Figure 2:
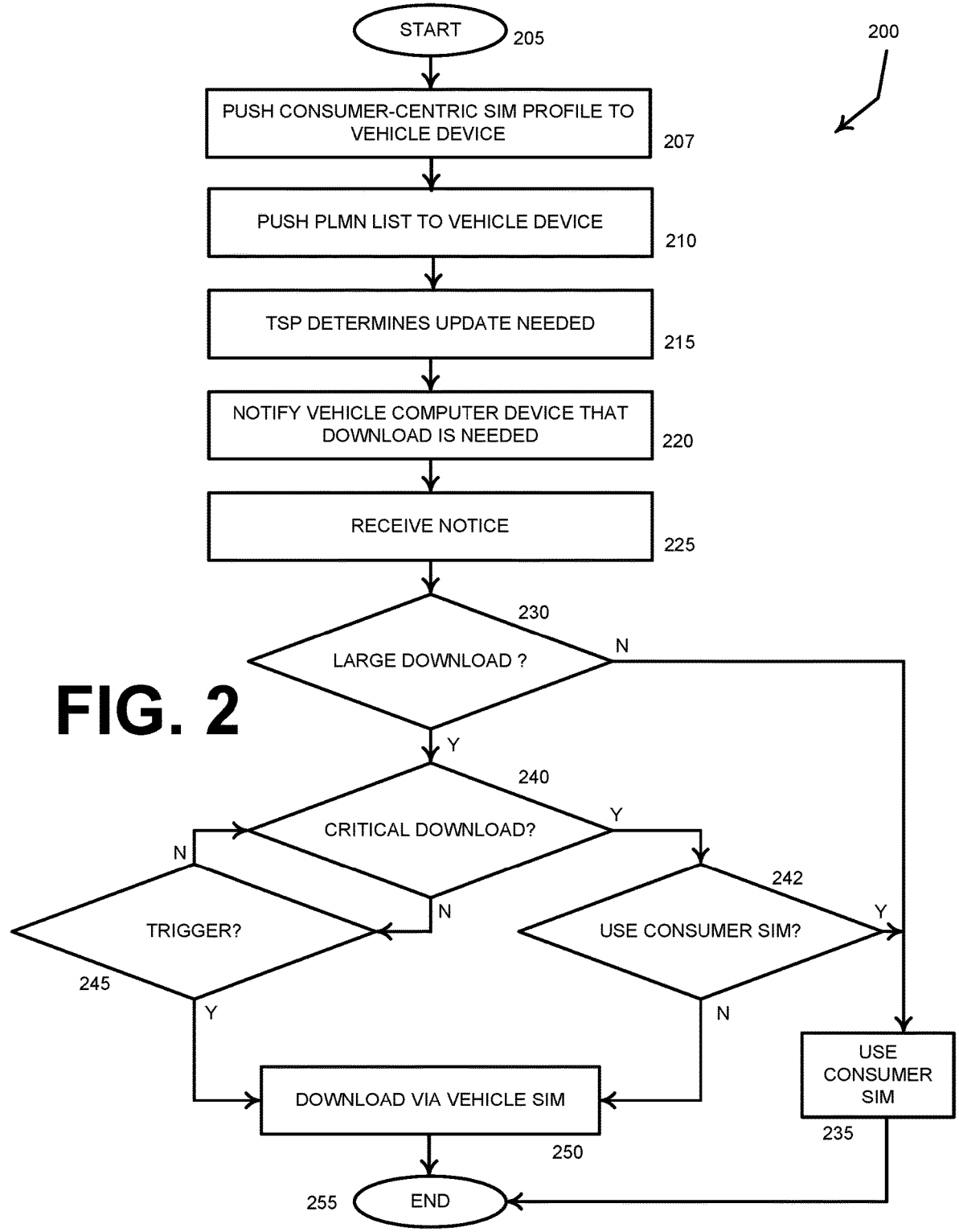
FIG. 2 illustrates a flow diagram of a method for delivering vehicle-centric services.

Turning now to FIG. 2, the figure illustrates a flow diagram of a method 200 for determining a SIM profile in a vehicle's mobile vehicle device to use for a given data flow to the wireless communication device, which may be referred to as a vehicle computer device. Method 200 begins at step 205. At step 207, a management platform pushes, or forwards, a consumer-centric SIM profile, or consumer-centric subscription information, to the vehicle computer device/vehicle control device 6 shown in FIG. 1. At step 210, a management platform transmits, or 'pushes,' a preferred local mobile network list ("PLMN") to the vehicle device. The PLMN list provides information for determining a network for a consumer-centric SIM profile in the vehicle computer device to use for consumer-centric high volume, high bandwidth services. The PLMN list causes TCU 6 to use the consumer-centric SIM profile to operate on networks as defined by, or authorized by, a network to which a consumer establishes, or has established, a subscription for obtaining consumer-centric services (i.e., high volume/high bandwidth services). For example, the PLMN list may include information such as a mobile country code ("MCC") and a mobile network code ("MNC") for the consumer SIM profile in vehicle computer device 6 to use for determining a network endpoint for sending and receiving consumer-centric services data. The MCC and MNC also compose an International Mobile Subscriber Identity ("IMSI"), which typically includes a number unique to the SIM card/profile. The MNC and MCC in a consumer SIM correspond to a network that a user has chosen as his, or her, preferred network, for example consumer network 12 shown in FIG. 1, for use by his, or her, consumer device, or devices. Similarly, a vehicle SIM/profile in vehicle wireless communication device 6 typically includes a SIM having an IMSI that corresponds to vehicle network 16. A user of vehicle 4, associated with vehicle wireless communication device 6 may from time-to-time change his, or her, preferred network carrier for providing of consumer-centric services, which change would typically result in a different IMSI being pushed to the vehicle wireless communication device by management platform 28. The PLMN lists in a predetermined order wireless mobile networks that have been authorized, approved, or otherwise permitted for use according to the predetermined order by the vehicle device 6 for consumer-centric services when a vehicle associated with the vehicle device is not located within a coverage area of a user's base, or home, mobile network.

At step 215, a vehicle manufacturer, a telematics services provider, a map data provider, or a traffic data/information provider, etc., determines that an update to information stored in a user's vehicle is needed. For example, a vehicle manufacturer may determine the need to wirelessly download to the vehicle an update to the vehicle's engine management software. Or, a map provider may have a map file for a given area that has been revised, or for an area that the vehicle has never been in before, that needs to be downloaded to the vehicle based on the current location of the vehicle. For purposes of discussion, a TSP may be referred to as the system or the entity that determines that a need exists to download information/data to a vehicle computer device, but any other entity may determine a need to download, or push, information to a vehicle and such other entity/system is contemplated when reference is made herein to a TSP determining the need to download information (i.e., vehicle-centric services) to a vehicle.

At step 220, the TSP transmits a pending download notification message ("notice") to the vehicle computer device, which receives the notice at step 225.

At step 230, the vehicle computer device determines, based on information contained in the notice, whether the pending download is a large file, contains a large volume of information, or requires very high security, such as would be the case for a firmware update to a vehicle's ECM. Such a volume/security determination may be made based on comparing a pending download file's size to a predetermined criterion. For example, if the file size to be downloaded is less than a predetermined high-volume threshold, the pending download may be deemed as not being a large pending download. In an aspect, the determination of volume at step 230 may be based on type of file, or type of information. For example, if the pending download file is a map, the vehicle wireless communication/computer device/control unit may determine that the file is likely large because it is a map file, even if an actual evaluation of the size of the file to be downloaded is not made, or if the size of the file to be downloaded is not provided in the notice.

If the pending download is deemed as not requiring very high security or is not large (which may be referred to herein as small) at step 230, method 200 advances to step 235. At step 235, the vehicle computer device uses a consumer SIM/profile to download the small file. Such downloading of a small file may occur even if a consumer is using his, or her, consumer SIM for consumer services, such as video stream—downloading of a small file is not likely to negatively impact delivery of consumer services, nor is it likely to significantly and negatively impact a monthly subscription data limit that the consumer may have for his, or her, data plan. After downloading using the consumer SIM at step 235, method 200 ends at step 255.

Returning to description of step 230, if the vehicle computer device determines that the pending download requires very high security, is a large file, or a large volume of data, method 200 advances to step 240. At step 240, the vehicle computer device determines whether the pending download is a critical download. For example, if the large pending download includes a map for an area that vehicle has never been before, or if map information has been revised for the area in which the vehicle is currently located as compared to map information that is currently stored in a navigation device or system associated with the vehicle, the vehicle computer device may deem the download as a critical download.

If a download is deemed critical at step 240, a determination may be made at step 242 whether the critical download is permitted to occur via the consumer-centric SIM, or consumer centric SIM profile. For example, if the consumer/user/driver/vehicle owner has configured the vehicle control unit to use his, or her, consumer SIM (and corresponding subscribed-to data plan data allotment) for downloading critical large vehicle-centric downloads while he, or she, is using the consumer SIM for consumer services data, the consumer services data flow may be suspended while the critical vehicle centric services are downloaded according to the consumer SIM profile at step 235 before method 200 ends at step 255.

In a more likely scenario, if a determination is made at step 242 that the consumer SIM profile has not been permitted for use is downloading large vehicle-centric data, a consumer-centric data flow session that may be currently used for obtaining consumer-centric services according to a consumer SIM, or consumer SIM profile, may be suspended and a vehicle-centric data flow may be established with the vehicle services SIM, or profile, for obtaining the large critical update at step 250 before method 200 ends at step 255.

Returning to description of step 240, if the vehicle computer device determines at step 240 that the large pending file to be downloaded is not a critical file, method 200 advances to step 245. At step 245, the vehicle computer device determines whether a trigger signal/message, corresponding to the occurrence of a trigger event, has been received. An example of a trigger event may be that the vehicle engine has been turned off, which event may be referred to as "key off." A trigger event may the changing from a current operational state of a vehicle (i.e., the vehicle engine is running or a user is downloading consumer-centric services data) to a changed operational state (i.e., key off or the termination of consumer-centric services). The trigger event may be referred to as a changed operational state and a message indicating that the trigger event has occurred may be referred to as a changed operational state message. If the trigger event has not occurred, the vehicle control unit computer device transmits a message to the TSP backend indicating that a data flow established according to the consumer SIM/profile is currently in use and that the download file or data should be buffered/stored until the vehicle control unit transmits a message that the trigger event has occurred, and the vehicle control unit continues checking to determine whether the trigger event has occurred at step 245. When a trigger signal/message is received, or indicated, method 200 advances to step 250. At step 250, the vehicle computer device downloads the pending download according to a vehicle SIM/profile, and ends at step 255 after the download has completed.

Downloading after key off provides an advantage for scenarios where a vehicle computer device has one set of long-range wireless radio receiver circuitry. Or, if no UE device is attached to the vehicle computer device via Wi-Fi for streaming of audio or video content (i.e., no consumer services are being used), the vehicle computer device may operate using the vehicle SIM profile to service a request for vehicle-centric services, even if the vehicle is operating. The consumer-centric SIM profile can be selected at times of customer demand (i.e., when a user decides to stream audio or video content to his or her UE via Wi-Fi from the vehicle computer device.

If a vehicle computer device has more than one set of receive circuitry, the device may download two different services/data flows simultaneously using two different SIMs/profiles. By waiting until key off occurs to download large updates, instead of during a consumer's data services session while he, or she, may be driving or otherwise using his or her vehicle, the large file download does not negatively impact delivery of the consumer services nor does it negatively impact any data-use charges the user might be responsible for if a consumer SIM/profile in the vehicle computer device was used for the large download, for which data use according to the consumer SIM/profile a user typically is financially responsible.

It will be appreciated that the notice described in reference to step 220 may be delivered over a secure tunnel, such as a virtual private network ("VPN") tunnel or Transmission Layer Security ("TLS") connected application between a vehicle services provider's back end computer system and the control unit of a vehicle using the consumer-centric SIM profile information, but actual vehicle services data, such as a reflash of a vehicles engine management software, may occur over a secure connection that is established between the vehicle services provider's back end system and the vehicle control unit using the vehicle-centric SIM profile.

Figure 3:
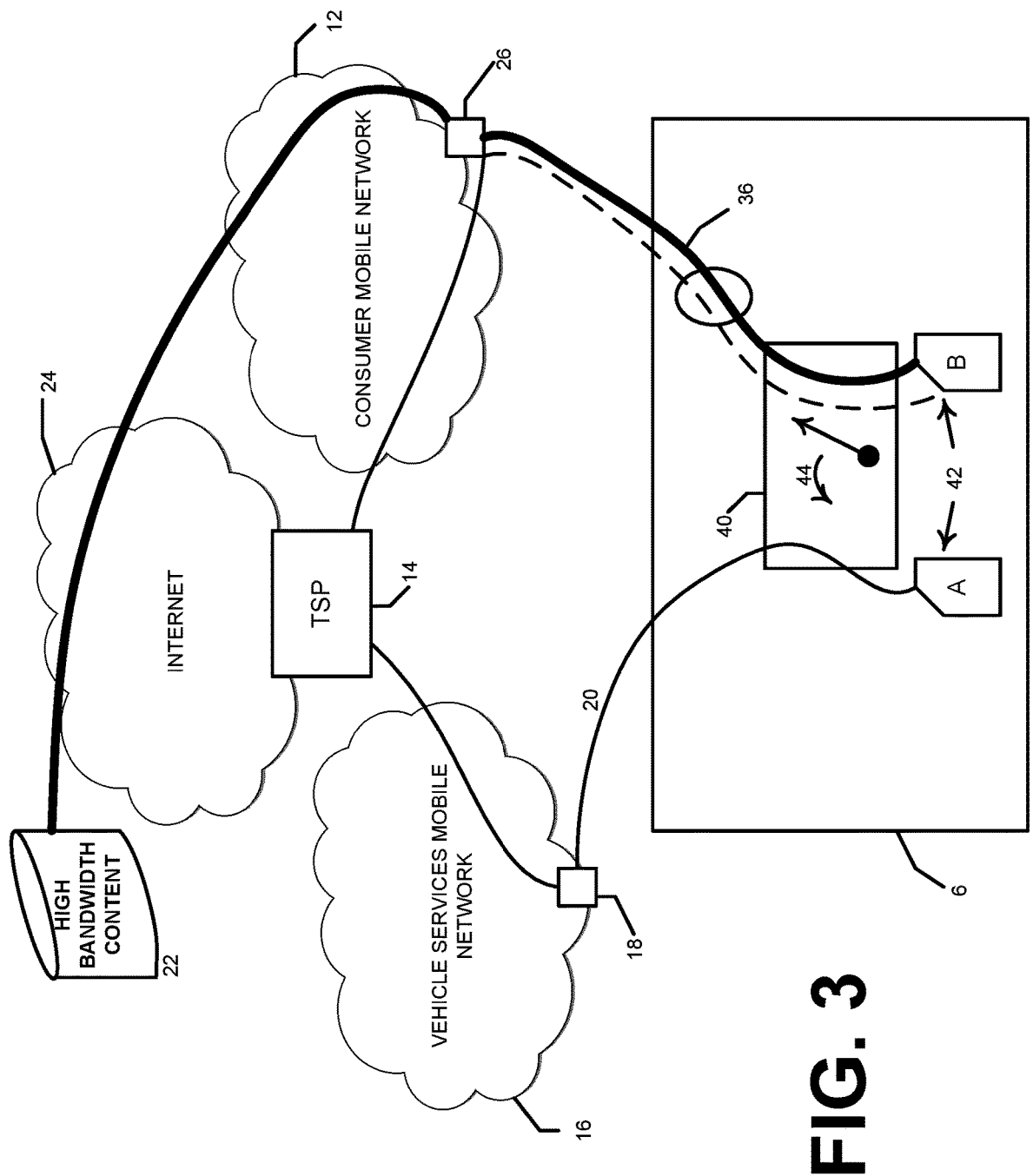
FIG. 3 illustrates a schematic diagram of vehicle control unit switching between SIM profiles to facilitate different data flows corresponding to different data categories.

Turning now to FIG. 3, a schematic diagram illustrates vehicle control unit 6 that is currently receiving consumer services via the solid line of flow path 36 from consumer APN 26 of network 12. The consumer services flow of flow path 36 is shown as a heavy line to indicate that consumer services are often, if not typically, high volume data flows that utilize high-bandwidth resources of a network. Control unit 6 includes processor 40, that controls, or routes data flows received via flow path 36 from consumer APN 26 to the control unit according to consumer SIM/profile 42B. Processor 40 is illustrated in the figure as a mechanical switch, but it will be appreciated that the switch icon represents a function that processor 40 may perform, and isn't meant to limit the processor to being a mechanical switch.

While receiving consumer services via the heavy line of flow path 36, a notice from TSP back end computer system 14 may transmit a notice to control unit 6 indicating that the control unit needs to download, or receive, vehicle-centric services data. The notice is shown as a broken line flowing through consumer APN 26 to processor 40 to illustrate that the notice is a separate service/data flow from the consumer services data flow that is shown as a heavy line in the figure, but that the notice flows over the same physical connection to control unit 6 as the consumer services data flow, but using a different logical connection. The vehicle service/data flow is separated from the consumer service/data flow by being preferably (but not necessarily) inside of a secure tunnel such as a VPN or TLS application connection.

When control unit 6 receives the notice, processor 40 may determine that it needs to facilitate downloading of the data referred to in the notice. Processor 40 may determine that it needs to perform the download referred to in the notice according to steps of method 200 discussed in reference to FIG. 2 above. As discussed in reference to FIG. 2, processor 40 may determine, or be informed in the notice, that the download is critical, and should be downloaded even if a consumer is currently receiving consumer services via data flow 36. Or, processor 40 may determine that a trigger event has occurred, such as a key off condition of the vehicle, and that download of the vehicle-centric data referred to in the notice may commence. As described above, download of vehicle-centric data, especially if high volume (i.e., a large software file, a large data file, or updated map information) preferably does not flow through a consumer data connection enabled by SIM 42B. An example of vehicle centric data services that do not comprise a large amount of data includes an operating system software update to an ECM, TCU, or other module of the vehicle.

Rather, vehicle-centric service data flows preferably flow to control unit 6 according to a data flow session established according to vehicle SIM/profile 42A. Thus, when control unit 6 determines that vehicle-centric services may commence, processor 40 directs the authentication and set-up of secure connection 20 to vehicle APN of vehicle network 16, which vehicle APN has been established in the vehicle network as dedicated to facilitate secure vehicle-centric communications with a plurality of vehicle control units, such as vehicle control unit 6 shown referred to in the figures. The figure shows the switch icon rotating in direction 44 to illustrate that incoming data flow tunnel 20 is established according to vehicle SIM 42A instead of consumer SIM 42B. Secure connection 20 may be a TLS encrypted tunnel, a VPN tunnel, or other type of secure connection using the vehicle VPN. It will be appreciated that determining when to switch from a secure tunnel that has been established according to consumer SIM 42B to a secure connection that is established according to vehicle SIM 42A advantageously allows use of one or more SIM profiles in control unit 6 to receive different services corresponding to respective ones of the plurality of SIM profiles when control unit 6 only has one set of radio receiver circuitry (i.e., one RF front end and one set of filters, etc.). Thus, although data flow/connection 36 and data flow/connection 20 are shown entering control unit 6 from consumer APN 26 and vehicle APN 18, respectively, it will be appreciated that both data flows/connections are physically received through the same RF receiver circuitry.

What is claimed is:

1. A method, comprising:
    establishing, with a vehicle wireless communication device, a connection over a consumer-centric wireless communication network that corresponds to a consumer-centric Subscriber Identity Module ("SIM") profile in the vehicle communication device using information of the consumer-centric SIM profile that is unique to the consumer-centric SIM profile;
    receiving, with the vehicle wireless communication device, a download notification via the connection over the consumer-centric wireless communication network using the consumer-centric SIM profile that vehicle-centric services data are to be downloaded;
    establishing, with the vehicle wireless communication device, a connection over a vehicle-centric wireless communication network that corresponds to a vehicle-centric SIM profile in the vehicle communication device using information of the vehicle-centric SIM profile that is unique to the vehicle-centric SIM profile; and
    downloading the vehicle centric data using the vehicle-centric SIM profile;
    wherein the download notification is received via the connection over the consumer-centric wireless communication network using the consumer-centric SIM profile through an encrypted tunnel and wherein the vehicle-centric services data are downloaded via the connection over the vehicle-centric wireless communication network using the consumer-centric SIM profile through an encrypted tunnel that is not the same encrypted tunnel through which the download notification was received.

2. The method of claim 1 further comprising:
    determining with the vehicle communication device one of a data size or a security level associated with the vehicle-centric services data that are to be downloaded based on content included in the download notification;
    determining with the vehicle communication device that the vehicle-centric services data may be downloaded during a current operational state of the vehicle.

3. The method of claim 2 wherein the current operational state of the vehicle is key-on.

4. The method of claim 2 wherein the data size of the vehicle centric services data to be downloaded satisfies a predetermined criterion.

5. The method of claim 4 wherein the current operational state of the vehicle is key-off.

6. The method of claim 2 wherein the security level is determined based on a nature of the vehicle-centric services data to be downloaded being one or more firmware updates to an engine control module of a vehicle that includes the vehicle communication device.

* * * * *